J. G. SMITH.
TANK HEATER.
APPLICATION FILED FEB. 23, 1915.
1,184,781. Patented May 30, 1916.
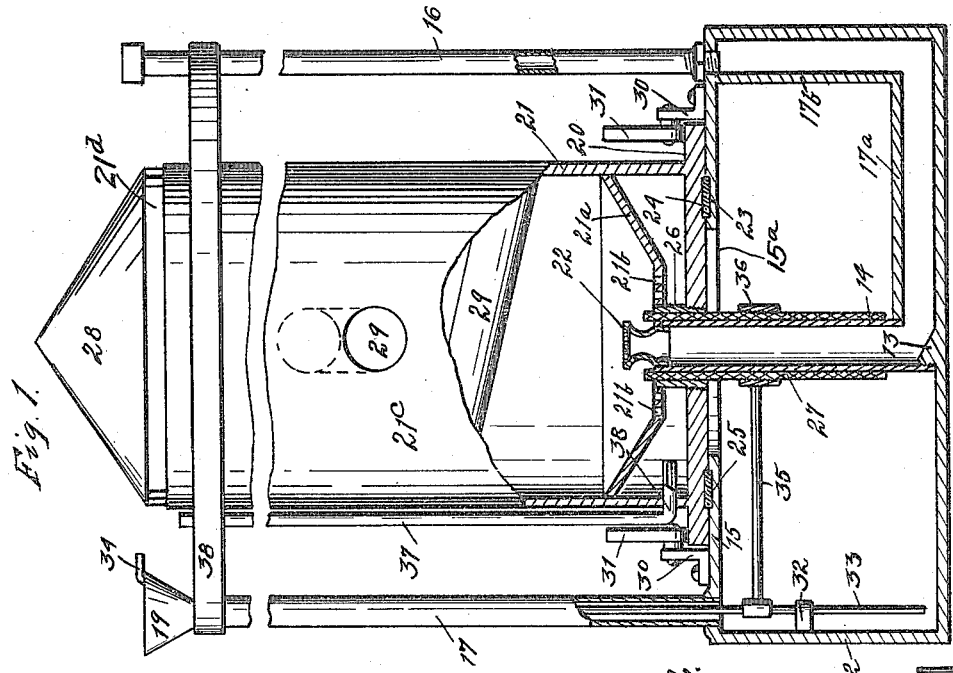
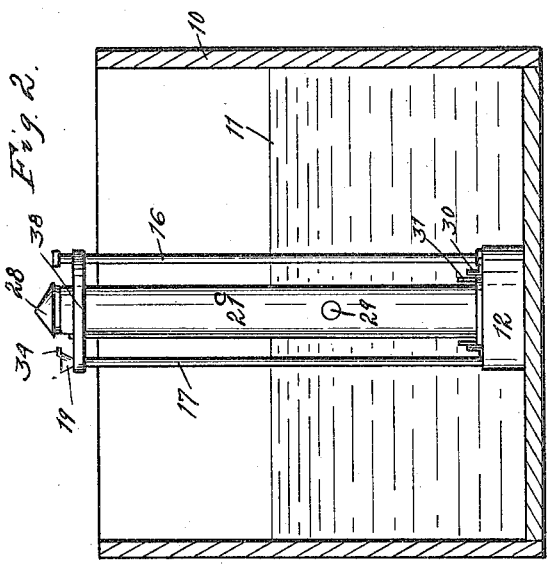
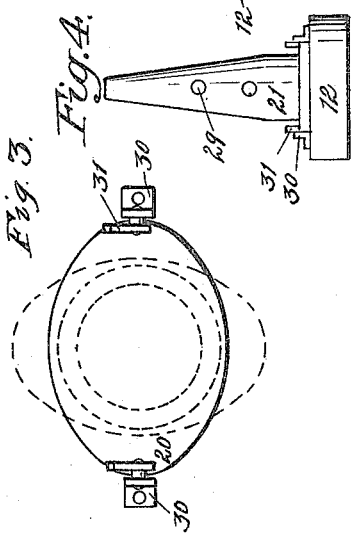
witnesses.
G. F. Fuecker.
Will Freeman
Inventor
James G. Smith
by Orwig & Bair
Att'ys

UNITED STATES PATENT OFFICE.

JAMES G. SMITH, OF NEWTON, IOWA.

TANK-HEATER.

1,184,781.  Specification of Letters Patent.  Patented May 30, 1916.

Application filed February 23, 1915. Serial No. 10,136.

*To all whom it may concern:*

Be it known that I, JAMES G. SMITH, a citizen of the United States, and resident of Newton, in the county of Jasper and State of Iowa, have invented a certain new and useful Tank-Heater, of which the following is a specification.

The object of my invention is to provide a tank heater of simple, durable and inexpensive construction.

A further object is to provide a tank heater of the type adapted to be placed in a tank of water, and so arranged as to furnish the heat to the lower portion of said tank.

Still a further object is to provide a heat device of the type mentioned, having heating means in its lower portion, said tank heater being provided with means for controlling the heating means for supplying fuel thereto, and for supplying fresh air to said heating means from outside the tank in which the heater is installed, without the removal of the heater.

Still a further object is to provide such a tank heater having a heating chamber adapted to be in a tank and provided with circular tubes.

My invention consists in the construction and arrangement and combination of the various parts of the device whereby the objects contemplated are attained, as hereinafter more fully set forth, pointed out in my claims, and illustrated in the accompanying drawings, in which:

Figure 1 shows a side elevation partly in section of a tank heater, embodying my invention. Fig. 2 shows a vertical sectional view of a tank having my heater installed therein, showing the general method of installation. Fig. 3 shows a top or plan view of the base of the heater, and Fig. 4 shows a side elevation of the device illustrating the preferred form of chimney.

In the exemplification of my invention illustrated in the accompanying drawings, I have used the reference character 10 to indicate a tank, adapted to hold water 11, which tank may be of any desired shape or size.

My improved tank heater is adapted to be placed in the tank and to be capable of being lifted out of the tank at any time. The lower part of the heater rests in the water and the upper portions of the heater are of such size and height as to stand above the upper level of the tank.

My improved heater comprises an oil receptacle 12 of any suitable material, but preferably of some material to withstand rust.

Formed on or mounted in the receptacle 12 and supported by the upwardly extending lug 13 is a wick tube 14 communicating at its lower end with a horizontal tube 17ª. Preferably formed on and communicating with the tube 17ª is an upwardly extending tube 17ᵇ which at its upper end communicates with an opening in the top 15 of the receptacle 12.

Extending upwardly from the top member 15, are two oppositely spaced tubes 16 and 17. The tube 16 is a ventilating tube and communicates with the tube 17ᵇ. On the upper end of the wick tube 14 is a suitable burner 22. A funnel 19 may be placed on the upper end of the cylinder 17. Resting on the top 15 is a base 20 of a chimney 21, which however, is smaller in diameter than the receptacle 12 and is tapered toward its upper end as shown in Fig. 4, or of the same diameter throughout as shown in modified form indicated at 21ᶜ in Figs. 1 and 2. The base 20 extends laterally beyond the lower end of the chimney 21.

Formed in the upper surface of the top 15 of the receptacle 12 and in the lower surface of the base 20 are annular grooves 23 and 24 which register with each other and are adapted to receive a suitable gasket 25. The central portion of the top 15 is preferably cut away around the tube 14 at 15ª. In the central part of the base 20 is an opening, in which is secured an upwardly extending cylinder 26 of greater diameter than the tube 14, and so arranged as to leave an annular space between the tube 14 and the cylinder 26. Mounted on the tube 14 is a wick 27 which is arranged to extend upwardly between the tube 14 and the cylinder 26 into the burner.

Mounted on the upper end of the chimney 21 is a cover 28 between which and the chimney 21 or 21ᶜ is a space 21ᵈ, adapted to permit the free passage of air. Extending through the chimney 21 are a plurality of circulating tubes 29, which are preferably inclined from the horizontal as shown. Mounted on the upper surface of the top 15, adjacent to the base 20, are brackets 30. Pivoted to the brackets 30 are cams 31, which are adapted to be moved to position for locking the base 20 to the top 15. Any suitable construction for securing the cylinder or chimney 21, to the receptacle 12 may be employed.

Extending downwardly through the tube 17, and slidably mounted in the bracket 32, is a rod 33 having a right angled extension 34 on its upper end above the funnel 19. Secured to the rod 33, and extending laterally therefrom, is a rod 35 on the end of which is a gripping device 36, adapted to engage and hold the wick. The parts just described are so arranged that by sliding the rod 33 upwardly or downwardly, the wick may be raised or lowered as desired. Any other suitable wick controlling means may be used.

Mounted on the outside of the chimney 21 is a ventilating tube 37. The lower end of the tube 37 is extended inwardly through the wall of the chimney 21 to the interior thereof at 38.

Within the chimney 21 is a baffle plate or collar 21ª which controls the flow of air from the tube 37 and directs it through the perforations 21ᵇ to the burner.

In the practical use of my improved tank heater, the heater is placed in a tank. The lamp is lighted by raising the cover 28 and lowering a lighted taper down to the wick. Assuming that proper fuel is in the receptacle 12 the lamp will then burn as desired. The lamp may be extinguished by closing the air supply passages or by forcing a draft of air downwardly through the chimney 21.

Air is furnished to the interior of the wick cylinder through the tubes 16, 17ª, 17ᵇ and 14. Air is furnished to the outside of the wick and the flame through the tube 37, and the perforations 21ᵇ of the collar 21ª, and complete ventilation is thereby provided for. The tube 17 may be used for replenishing the fuel supply and also permits the air to pass out as the fuel is lowered to the receptacle 12.

A reinforcing and supporting band 38 is mounted on the upper ends of the tubes 16 and 17 and extends along the opposite sides of the chimney 21, to which it may be secured if desired for supporting said chimney. If desired, the heater may be removed from the tank by grasping the member 38 and raising the heater.

The base 20 may be elliptical in shape, as shown in Fig. 3, to permit the chimney 21 to be moved and lifted upwardly to clear the member 38. It will readily be seen that by releasing the cams 31 and rotating the chimney 21, the chimney 21 may be separated from the receptacle 12, thereby permitting access to the wick and the burner.

It will be understood that some changes may be made in the arrangement and construction of the parts of my improved tank heater, without departing from its essential features and purposes, and it is my intent to cover by this application any such changes which may be included within the scope of my claims.

I claim as my invention—

1. In a tank heater, a fuel receptacle, a chimney mounted above the central portion thereof by a water tight joint connection, a wick tube in said receptacle extending upwardly into said chimney, a wick on said tube, tubes communicating with said receptacle and extending upwardly therefrom, one of said tubes being adapted to supply air, and the other being adapted to supply fuel to said receptacle, and a supporting member secured to the upper ends of said tubes adapted to support said chimney.

2. In a device of the class described, a receptacle, a chimney on the top thereof, a gasket arranged between said chimney and said receptacle, cam devices on said receptacle for locking the bottom of the chimney to the receptacle, a wick tube in the receptacle extending upwardly into the chimney, a cylinder mounted in the top of the receptacle, and extending upwardly into the chimney, said cylinder being spaced from said wick tube, a perforated plate on the upper end of said cylinder extending substantially to the walls of said chimney, a wick on said wick tube, upwardly extending tubes communicating with said receptacle, a wick controlling means having a portion extended through one of said tubes, an air supply tube leading to the lower interior of said chimney below said perforated plate.

3. In a tank heater, a fuel receptacle, a circular wick mounted therein and slidably mounted in the top of said receptacle, a burner above said receptacle, a chimney mounted on the top of said receptacle, means for supplying air to the lower interior of said wick tube from the top of the heater, means for supplying fuel to said receptacle from the top of the heater, means for manipulating the wick from the top of the heater when the heater is in a tank of water, a perforated collar in the chimney around said burner, and an air supply tube leading from the upper part of the device to a point below said collar within the chimney, supporting means for connecting the upper end of the chimney with said first and second means.

Des Moines, Iowa, February 4, 1915.

JAMES G. SMITH.

Witnesses:
A. SHERMAN,
J. MAHER.